United States Patent
Hollis

(10) Patent No.: US 8,682,621 B2
(45) Date of Patent: Mar. 25, 2014

(54) SIMULATING THE TRANSMISSION OF ASYMMETRIC SIGNALS IN A COMPUTER SYSTEM

(75) Inventor: Timothy M. Hollis, Meridian, CA (US)

(73) Assignee: Micron Technology, Inc., Boise, ID (US)

( * ) Notice: Subject to any disclaimer, the term of this patent is extended or adjusted under 35 U.S.C. 154(b) by 611 days.

(21) Appl. No.: 12/838,144

(22) Filed: Jul. 16, 2010

(65) Prior Publication Data
US 2012/0016651 A1     Jan. 19, 2012

(51) Int. Cl.
G06F 17/50         (2006.01)
(52) U.S. Cl.
USPC ............... 703/2; 703/13; 703/23; 708/835; 375/144; 375/147
(58) Field of Classification Search
USPC ............ 703/2, 13, 23; 375/144, 147; 708/835
See application file for complete search history.

(56) References Cited

U.S. PATENT DOCUMENTS

| | | | |
|---|---|---|---|
| 6,584,486 B1 * | 6/2003 | Helfenstein et al. | 708/835 |
| 7,142,583 B2 * | 11/2006 | Lysejko et al. | 375/144 |
| 7,194,093 B1 * | 3/2007 | Thiede | 381/58 |
| 2002/0126743 A1 * | 9/2002 | Lysejko et al. | 375/147 |
| 2006/0241929 A1 * | 10/2006 | Ferris | 703/23 |
| 2009/0094302 A1 | 4/2009 | Hollis | |
| 2009/0110116 A1 | 4/2009 | Hollis | |

OTHER PUBLICATIONS

B. Casper et al., "An Accurate and Efficient Analysis Method for Multi-Gb/s Chip-to-Chip Signaling Schemes," 2002 Symposium on VLSI Circuits Digest of Technical Papers, pp. 54-57 (2002).
Stateye V.4.2.3 Documentation (2007).
Nexxim product by Ansoft (http://www.ansoft.com/products/hf/nexxim/).
Advanced Design System product by Agilent (http://www.home.agilent.com/agilent/product.jspx?cc=US&lc=eng&ckey=1297113&nid=-34346.0.00&id=1297113).

* cited by examiner

*Primary Examiner* — Thai Phan
(74) *Attorney, Agent, or Firm* — Schwegman, Lundberg & Woessner, P.A.

(57) ABSTRACT

Methods implementable in a computer system for simulating the transmission of signals are disclosed. The disclosed techniques simulate the effect of the transmitter as well as the channel on a positive and negative pulse, which assures that asymmetry in the transmitter is captured. The resulting positive and negative pulse responses are then used to generate two separate PDFs: one indicative of received logic '1's and another indicative of received logic '0's at a point in time. Generating a plurality of such PDFs at different times allows the reliability of data reception to be assessed, and appropriate sensing margins to be set at a receiver, without the need to simulate the transmission of a very long random stream of data bits.

25 Claims, 16 Drawing Sheets

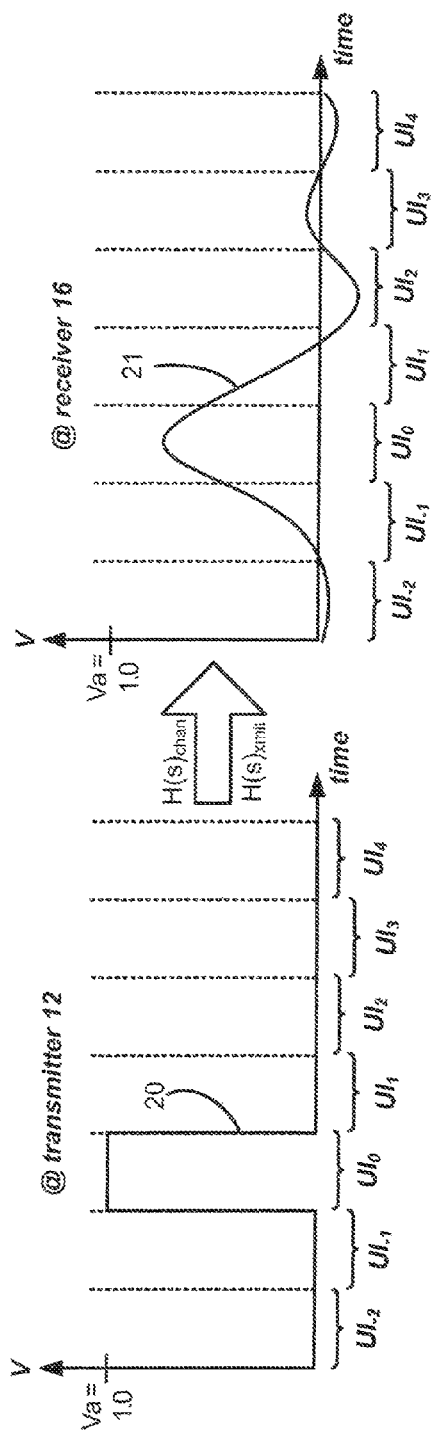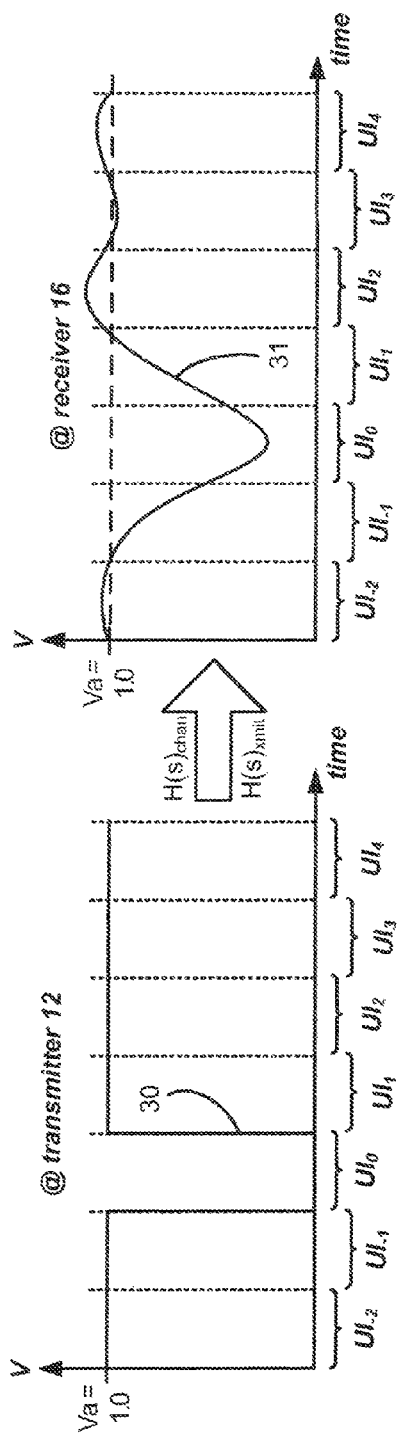
Figure 5A
Figure 5B

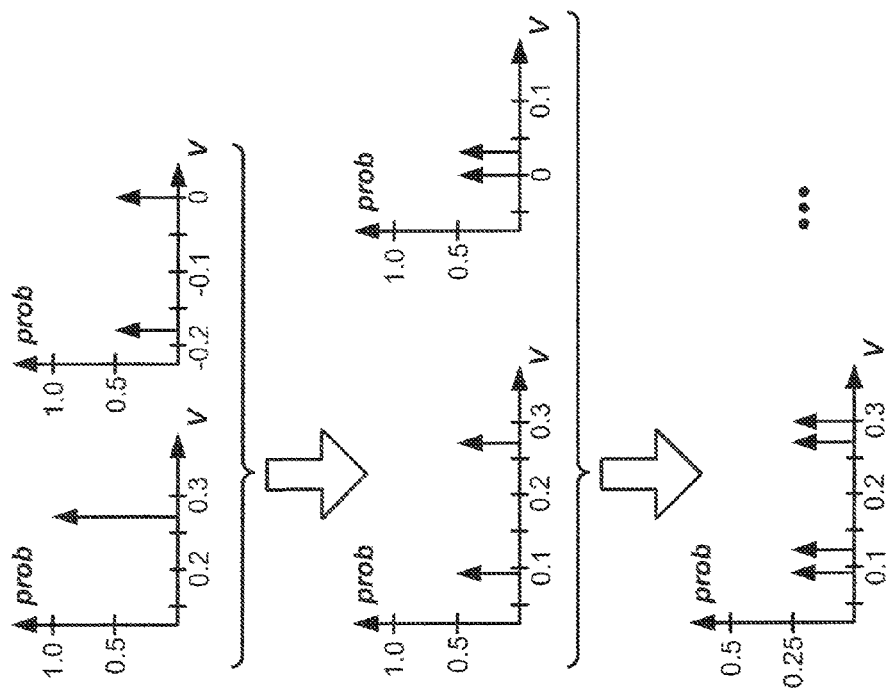

$PDF(i)_0 = \underline{Y(i)_0} * (X(i)_{-1}, 0) * (X(i)_{-2}, 0) * \ldots * (X(i)_1, 0) * (X(i)_2, 0) * \ldots$
$= \mathbf{0.27} * (0.15, 0) * (-0.025, 0) * \ldots * (0.2, 0) * (-0.15, 0) * \ldots$ $PDF(i)_1 = X(i)_0 * (Y(i)_{-1}, 0) * (Y(i)_{-2}, 0) * \ldots * (Y(i)_1, 0) * (Y(i)_2, 0) * \ldots$
$= 0.75 * (-0.18, 0) * (0.03, 0) * \ldots * (-0.22, 0) * (0.1, 0) * \ldots$

*Figure 11A*

$PDF(i)_0 = \underline{Y(i)_0} * (X(i)_{-1}, 0) * (X(i)_{-2}, 0) * \ldots * (X(i)_1, 0) * (X(i)_2, 0) * \ldots * (Y(i)_{-1}, 0) * (Y(i)_{-2}, 0) * \ldots * (Y(i)_1, 0) * (Y(i)_2, 0) * \ldots$
$= \mathbf{0.27} * (0.15, 0) * (-0.025, 0) * \ldots * (0.2, 0) * (-0.15, 0) * \ldots * (-0.18, 0) * (0.03, 0) * \ldots * (-0.22, 0) * (0.1, 0) * \ldots$ $PDF(i)_1 = X(i)_0 * (Y(i)_{-1}, 0) * (Y(i)_{-2}, 0) * \ldots * (Y(i)_1, 0) * (Y(i)_2, 0) * \ldots * (X(i)_{-1}, 0) * (X(i)_{-2}, 0) * \ldots * (X(i)_1, 0) * (X(i)_2, 0) * \ldots$
$= 0.75 * (-0.18, 0) * (0.03, 0) * \ldots * (-0.22, 0) * (0.1, 0) * \ldots * (0.15, 0) * (-0.025, 0) * \ldots * (0.2, 0) * (-0.15, 0) * \ldots$

*Figure 11B*

$PDF(i)_0 = \underline{Y(i)_0} * ([AVG(X(i)_{-1}, Y(i)_{-1}], 0) * ([AVG(X(i)_{-2}, Y(i)_{-2}], 0) * \ldots * ([AVG(X(i)_1, Y(i)_1], 0) * ([AVG(X(i)_2, Y(i)_2], 0) * \ldots$
$= \mathbf{0.27} * (-0.015, 0) * (0.0025, 0) * \ldots * (-0.01, 0) * (-0.025, 0) * \ldots$ $PDF(i)_1 = X(i)_0 * ([AVG(X(i)_{-1}, Y(i)_{-1}], 0) * ([AVG(X(i)_{-2}, Y(i)_{-2}], 0) * \ldots * ([AVG(X(i)_1, Y(i)_1], 0) * ([AVG(X(i)_2, Y(i)_2], 0) * \ldots$
$= 0.75 * (-0.015, 0) * (0.0025, 0) * \ldots * (-0.01, 0) * (-0.025, 0) * \ldots$

*Figure 11C*

SIMULATING THE TRANSMISSION OF ASYMMETRIC SIGNALS IN A COMPUTER SYSTEM

CROSS REFERENCE TO RELATED APPLICATIONS

This application is concurrently filed with another patent application entitled "Simulating the Transmission and Simultaneous Switching Output Noise of Signals in a Computer System," by the same inventor.

FIELD OF THE INVENTION

This invention relates to improved methods for simulating the transmission of signals in a computer system.

BACKGROUND

Circuit designers of multi-Gigabit systems face a number of challenges as advances in technology mandate increased performance in high-speed components. At a basic level, data transmission between high-speed components within a single semiconductor device or between two devices on a printed circuit board may be represented by the system 10 shown in FIG. 1. In FIG. 1, a transmitter 12 at a transmitting device 8 (e.g., a microprocessor) sends data over a transmission channel 14 (e.g., a copper trace on a printed circuit board or "on-chip" in a semiconductor device) to a receiver 16 at a receiving device 9 (e.g., another processor or memory). When data is sent from an ideal transmitter 12 to a receiver 16 across an ideal (lossless) channel, all of the energy in a transmitted pulse will be contained within a single time cell called a unit interval (UI).

However, real transmitters and real transmission channels do not exhibit ideal characteristics, and the effects of transmission channels are becoming increasingly important in high-speed circuit design. Due to a number of factors, including, for example, the limited conductivity of copper traces, the dielectric medium of the printed circuit board (PCB), and the discontinuities introduced by vias, the initially well-defined digital pulse will tend to spread or disperse as it passes along the channel 14. This is shown in FIG. 2. As shown, a single ideal positive pulse 20 is sent by the transmitter 12 during a given UI (e.g., $UI_0$). However, because of the effect of the channel 14, this data pulse 20 becomes spread 21 over multiple UIs at the receiver 16, i.e., some portion of the energy of the pulse is observed outside of the UI in which the pulse was sent (e.g., in $UI_{-1}$ and $UI_1$). This residual energy outside of the UI of interest may perturb a pulse otherwise occupying either of the neighboring UIs in a phenomenon referred to as intersymbol interference (ISI).

Due to several factors associated with the complexity in designing, building, and testing such circuitry, it is a common practice in the art of integrated circuit design to simulate the operation of a circuit using a computer system. Simulation software allows the circuit designer to verify the operation and margins of a circuit design before incurring the expense of actually building and testing the circuit. Simulation is particularly important in the semiconductor industry, where it is generally very expensive to design and produce a given integrated circuit. Through the use of simulations, design errors or risks are hopefully identified early in the design process, and resolved prior to fabrication of the integrated circuit.

The challenge associated with simulating channel-affected signals is highly correlated to the characteristics of the degradation imposed by the transmission channel, and so simulation has focused on the effect that the channel has on transmitted signals. One such approach was discussed in B. Casper et al., "An Accurate and Efficient Analysis Method for Multi-Gb/s Chip-to-Chip Signaling Schemes," 2002 Symposium on VLSI Circuits Digest of Technical Papers, pp. 54-57 (2002), which is submitted in the Information Disclosure statement accompanying the filing of this disclosure, and which technique is summarized in FIGS. 3A-3E.

Casper's technique assumes a particular transfer function, $H(s)_{chan}$, for the channel 14, which transfer function models the capacitance, resistance, and other parameters of the channel. By entering such transfer function information and other modeling information into a computer system, as is typical, the effects of the channel 14 on an idealized positive pulse 20 are simulated, resulting in a positive pulse response 21, similar to FIG. 2. The ideal positive pulse has a magnitude of Va, which would comprise the ideal magnitude of the logic '1' data bits transmitted along the channel 14 being simulated, with ideal logic '0' bits comprising zero Volts. The actual value of Va would depend on the system being modeled but is assumed to be one Volt for simplicity and as representative of the logic levels in current transmission systems. An example positive pulse response 21 is seen in further detail in FIG. 3A, and is described as a function X. As was the case in FIG. 2, the majority of the energy of the distorted positive pulse 21 occurs in $UI_0$, which corresponds to the UI of the ideal positive pulse 20, and which may be referred to as the cursor UI for short. Some energy also occurs before $UI_0$, e.g., in unit intervals $UI_{-1}$ and $UL_{-2}$, which may be referred to as precursor UIs. Likewise, some energy occurs after $UI_0$, e.g., in unit intervals $UI_1$ and $UI_2$, which may be referred to as post-cursor UIs.

The positive pulse response 21, X, may be described as a series of discrete points, each referenced to a particular time 'i' in the unit intervals. Index 'i' is shown in FIG. 3A such that the points are roughly in the middle of each UI, but this is merely illustrative. These points may be modeled as a series of delta functions X(i) occurring at each of the T UIs, as shown in the equation at the top of FIG. 3A, with each delta function $\delta(j)$ being scaled by the magnitude of the positive pulse response 21 at that UI, i.e., $X(i)_j$. Such delta function scaling is commonly utilized in digital signal processing sampling theory. Viewed more simply, and as is more convenient for simulation in a computer system, the positive pulse response 21 may also be characterized as a vector containing each of the magnitude components (e.g., [ ... $X(i)_{-2}$, $X(i)_{-1}$, $X(i)_0$, $X(i)_1$, $X(i)_2$ ... ] or [ ... −0.025, 0.15, 0.75, 0.2, −0.15 ... ] to use the voltage values actually illustrated). How many magnitude terms are used, or how long the vector will be, is a matter of preference, but would logically incorporate the bulk of the positive pulse response 21. More terms will improve the accuracy of the analysis to follow, but will require additional computing resources.

Also shown in FIG. 3A is a zero response 22, Z, which characterizes the transmission of a logical '0' across the channel. As can be seen, this zero response 22 assumes that the channel 14 has no effect, and as such the resulting magnitude values $Z(i)_j$ are all set to zero. Although seemingly uninteresting, the zero response 22 is used in Casper's technique along with the positive pulse response 21 to generate statistics regarding receipt of data at the receiver 16, as will be seen below.

From the positive pulse response 21 and the zero response 22, i.e., from vectors X(i) and Z(i), Casper's technique derives a probability distribution function (PDF) at time T as shown in FIGS. 3B and 3C, which PDF(i) is meant to simulate where the receiver 16 could statistically expect to see signal voltage values occurring at the end of the channel 14. Casper's technique uses convolution to derive the PDF(i), as illustrated in some detail in FIG. 3B, and more specifically involves a recursive convolution of various pairs of corresponding terms $X(i)_j$ and $Z(i)_j$ in the positive pulse response 21 and the zero response 22. Take for example the terms corresponding to the cursor UI $X(i)_0$ and $Z(i)_0$. Because these terms both occur within the same UI, $UI_0$, they are written in FIG. 3B as a pair $(X(i)_0, Z(i)_0)$ or (0.75, 0) to use the actual illustrated values. This pair recognizes that the receiver could expect to see a value of 0.75 if a logic '1' was transmitted, or a value of zero if a logic '0' was transmitted, and assumes in a random data stream that reception of either of these values are equally probable. Thus, this pair can be represented as a PDF having two delta functions, one each at values 0.75 and 0, and each having a magnitude of 0.5 (50%). Likewise, and working with the pre-cursor interval pairs first, the next pair $(X(i)_{-1}, Z(i)_{-1})$ or (0.15, 0) can also be represented as a PDF having two delta functions. These two pairs can then be convolved as shown, resulting in yet another PDF illustrating the now four possibilities for the received voltages (0, 0.15, 0.75, and 0.9), each with a probability of 0.25 (25%). Convolution (represented herein using an asterisk symbol is a well-known mathematical technique for cross-correlating two functions, and is assumed familiar to the reader. Convolution is a linear operation, and therefore relies on the mathematical assumption that the system under analysis is linear, time-invariant (LTI), a well-known and common assumption. Introduction of system nonlinearities introduces errors during the calculation process. It should be understood that the PDF resulting from the convolution is appropriately scaled to achieve a sum total probability of 1, although such scaling is not shown in the formulas in the Figures.

This resulting PDF can then be convolved with a third pair of terms $(X(i)_{-2}, Z(i)_{-2})$ or (−0.025, 0), resulting in a new PDF with eight values, each with probabilities of 0.125 (12.5%), and so on until all of the pre-cursor pairs have been convolved. Thereafter, and as shown in the formula in FIG. 3B, the post-cursor pairs are similarly recursively convolved, until all pairs of interest have been treated. (It bears noting here that convolution is commutative, and therefore it does not matter in which order the various pairs are convolved). Eventually, when all of the pairs of terms have been recursively convolved, the result is a final PDF at time 'i,' as illustrated in FIG. 3C. Because an actual PDF, as calculated this way in a computer system will likely have discrete values, curve fitting can be used to arrive at a PDF which is smooth, as shown in FIG. 3C. As would be expected, the resulting PDF is bi-modal, comprising two lobes corresponding to the received voltages for the transmission of a logic '1' and/or '0' across the channel 14, which again are assumed to be transmitted with equal probabilities, such that each lobe encompasses an area of 0.5 (50%). Although the PDF lobes, as illustrated in FIG. 3C, appear Gaussian, the actual resulting shape will depend on the particulars of the channel 14 being simulated.

Once the PDF is determined for a particular time 'i', 'i' can be changed, allowing for new terms X(i) and Z(i) to be determined from responses 21 and 22, and for a new PDF to be determined. The cumulative effect is illustrated in FIG. 3D, which shows the PDFs as determined for different values of 'i' across the cursor UI. As would be expected, the lobes of the PDFs are sharper and better separated near the center of the UI, signifying that the resolution at the receiver 16 between logic '1' and '0' is statistically easier in such areas. Toward the edges of the UI, the lobes are closer and broader, indicating that the resolution at the receiver 16 between logic '1' and '0' is statistically more difficult in such areas.

These PDFs in sum allow the reliability with which data is received at the receiver 16 to be analyzed. Such data also allows sensing margins 25 to be set, and bit error rates to be deduced. For example, on the basis of the PDFs illustrated in FIG. 3D, it may be decided that the receiver 16 should sample received data anywhere between $t_1=45$ ps to $t_2=55$ ps within the UI, and use a reference voltage between $Vref_1=0.34$ and $Vref_2=0.41V$ to discern between logic '0's and '1's, because the statistics of the PDFs indicate an acceptable bit error rate (e.g., no more than 1 error in $10^{12}$ bits) within these margins 25. As such, Casper's technique is similar in nature to "eye diagrams" (FIG. 3E) also used to assess data reception reliability, and to set appropriate sensing margins. See, e.g., U.S. Patent Application Publication 2009/0110116, discussing eye diagrams in further detail. In an eye diagram, successive UIs of a simulated received signal (usually, a random bit stream) are overlaid to see where the signals occur, and where a clear "eye" exists within the margins. To generate an eye diagram, the designer must simulate the data transmission over thousands-to-millions of cycles to arrive at statistically significant bit error rates. Casper's technique, by contrast, doesn't require randomizing the input data, and thus provides a simpler method to, in effect, generate an "eye" to characterize a channel without the need for simulation of an actual randomized bit stream of data. Instead, only simulation of the transmission of a single ideal positive pulse 21, and analysis of the resulting positive pulse response 21, is needed.

Still, the inventor has realized that Casper's technique suffers certain shortcomings, and can be improved. Such improvements are discussed herein.

BRIEF DESCRIPTION OF THE DRAWINGS

FIGS. 5A and 5B illustrate the simulations involved in the improved technique for generating separate PDFs indicative of the statistics of reception of logic '0's and '1's using positive and negative pulses.

FIGS. 9A-9D illustrate one example of the disclosed technique.

FIGS. 11A-11C illustrate other examples of the disclosed technique.

DETAILED DESCRIPTION

Figure 4:
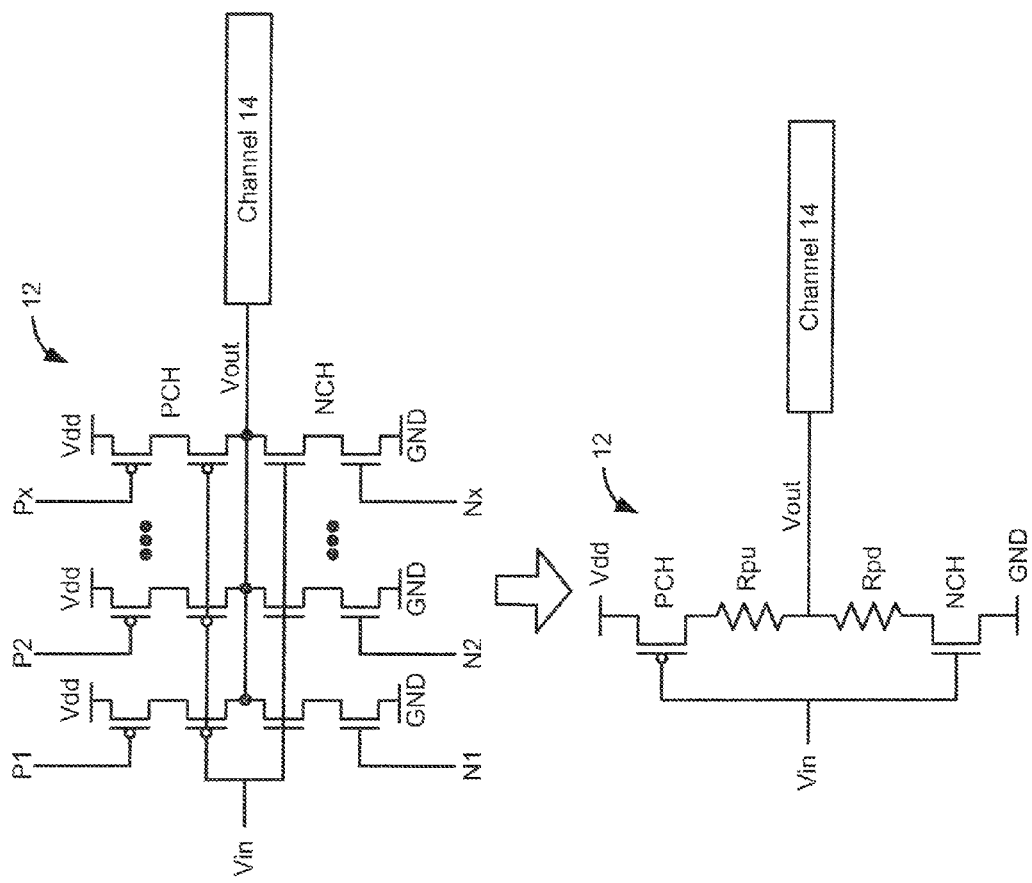
FIG. 4 illustrates an example transmitter, and shows transistors of different polarities which make asymmetric transmission of logic '0's and '1's a statistical possibility.

The inventor has noticed that Casper's technique generates a PDF (or a group of PDFs when index 'i' is changed) in which the two logic '1' and logic '0' lobes are symmetric, i.e., both lobes have the same shape. Such a result naturally occurs because the PDFs are generated through a single recursive calculation. But such symmetry is often not observed in real-world applications. Consider for example the simple transmitter of FIG. 4. As is typical of most transmitters implemented using CMOS technology, transmitter 12 uses both P-channel (PCH) and N-channel (NCH) transistors. It is difficult to manufacture such transistors to behave symmetrically, and as a result, both pull-up and pull-down branches of the transmitter are formed with multiple, independently controlled parallel legs. Thus if more pull-up strength is needed, more pull-up legs may be enabled (via P1, P2, ... Px), relative to the number of pull-down legs (via N1, N2, ... Nx). Three issues result from the use of these multiple parallel legs: first, each leg takes up real estate on the chip, which can be costly; second, each leg adds capacitance to the node at the transmitter's output, which tends to degrade bandwidth or switching speed; and finally, the transistor switching is a nonlinear operation, which tends to distort the output waveform and makes the transmitter incompatible with Casper's analysis technique. The effective pull-up and pull-down resistances (Rpu and Rpd), which can include passive resistors placed in the legs, are used to linearize the output of the transmitter, but such compensation is not perfect.

Accordingly, the disclosed technique, unlike Casper's technique, considers the effect of the transmitter 12 ($H(s)_{xmit}$) as well as the channel ($H(s)_{chan}$) and additionally uses a negative pulse response as well as a positive pulse response to capture the effects of asymmetry in the transmitter 12. Using both positive and negative pulse responses assures that the pull up and pull down mechanics in the transmitter 12 are simulated to capture any differences between the two. The resulting positive pulse response and negative pulse response are then used to generate two separate PDFs: one indicative of received logic '1's and the other indicative of received logic '0's, as will be explained further below.

Figure 1:
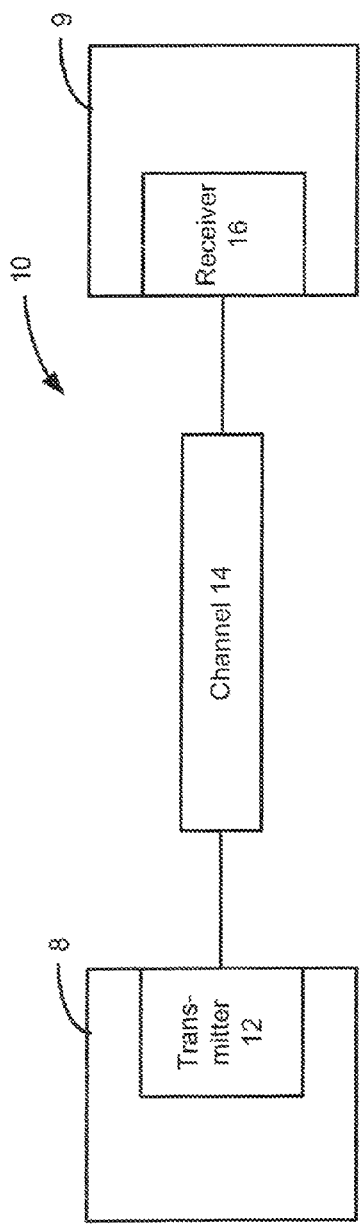
FIG. 1 illustrates a block diagram of a transmission system having a channel.
Figure 2:
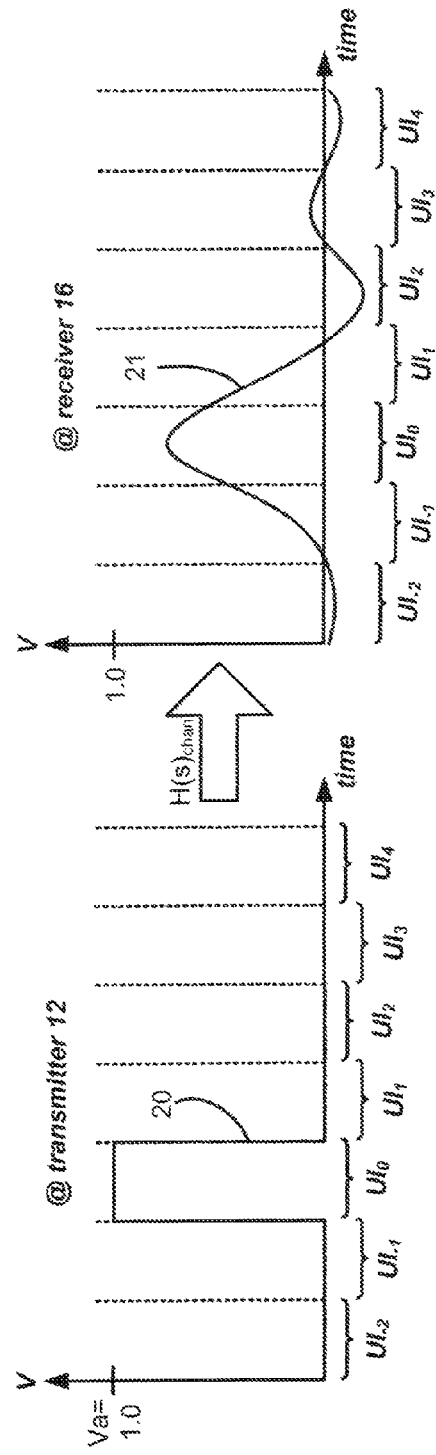
FIG. 2 illustrates the effect of a channel on an ideal positive pulse transmitted across the channel.

FIGS. 5A and 5B illustrate the simulations involved in the improved technique. FIG. 5A, like FIG. 2, shows an ideal positive pulse 20 of magnitude Va, which is used as an input to the simulation. That input pulse is then simulated both as it propagates through a transmitter 12 as well as the channel 14 to arrive at positive pulse response 21. As with the channel 14, the specifics of the transmitter 12 (resistances, capacitances, transistor sizes, etc.) can be input to the simulation software to produce the positive pulse response. Shown in FIG. 5B is an ideal negative pulse 30, and its resulting negative pulse response 31, which is simulated similarly to the positive pulse.

Figure 6:
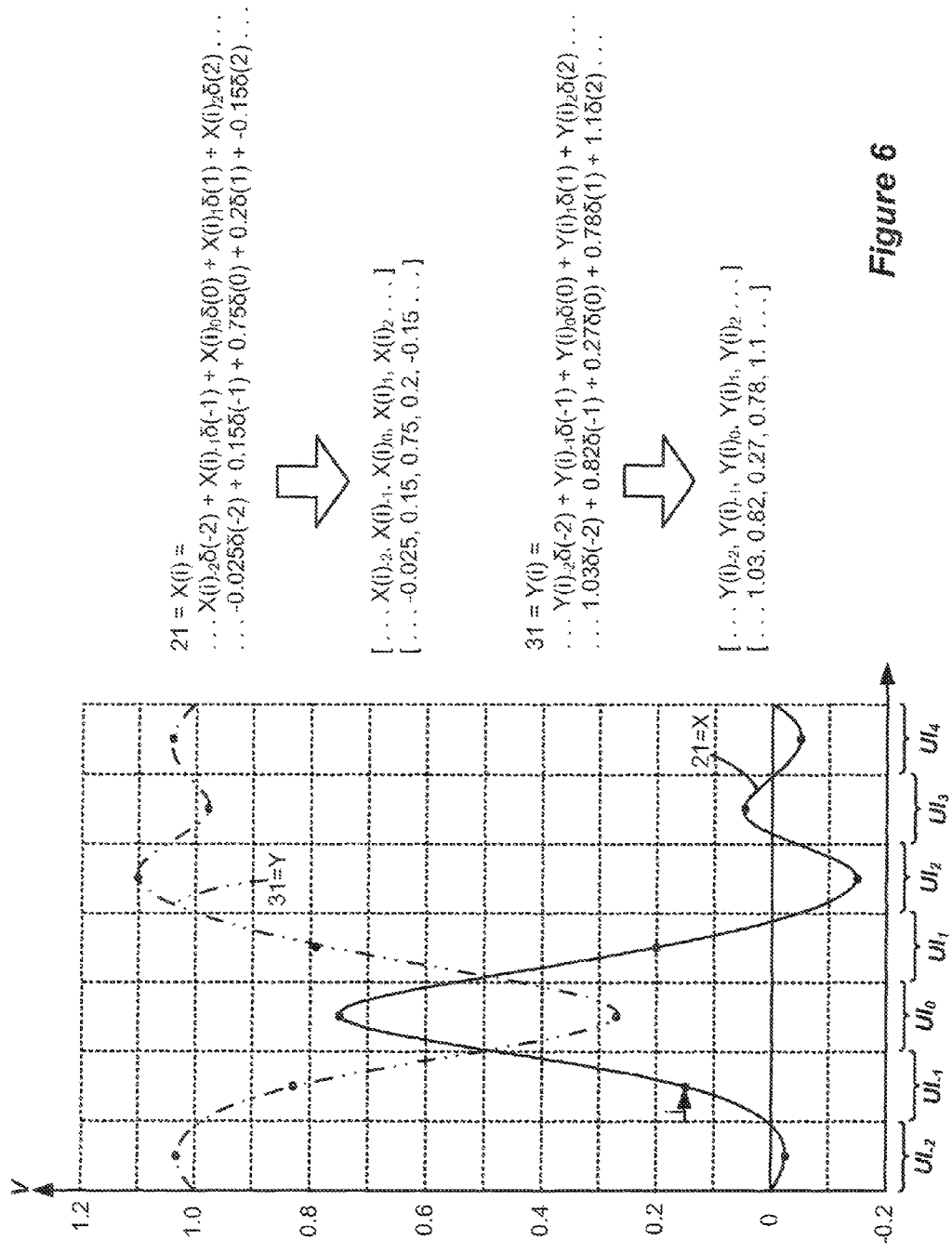
FIGS. 6-8 illustrate the positive and negative pulse responses of FIGS. 5A and 5B, and discuss the formation of vectors having data useful in the computations of the disclosed technique.

FIG. 6 shows the positive and negative pulse responses 21 and 31, represented as functions X(i) and Y(i) respectively. As described in the Background, these two functions can be described as a series of delta functions scaled by the magnitude of the pulse responses 21 and 31 at the various UIs, i.e., $X(i)_j$ and $Y(i)_j$. The positive and negative pulse responses 21 and 31 may also be characterized as vectors (in brackets) containing each of the magnitude components, and once again actual values are illustrated to assist in understanding the disclosed technique. Notice for simplicity that the actual values for the positive pulse response 21 have remained unchanged from those discussed in the Background, although it should be remembered that in actuality those values have resulted from simulation of the transmitter 12 ($H(s)_{xmit}$) and the channel 14 ($H(s)_{chan}$). Once again, how long each vector will be is a matter of preference, but would logically incorporate the bulk of the pulse responses 21 and 31 to improve the accuracy of the technique.

Figure 7:
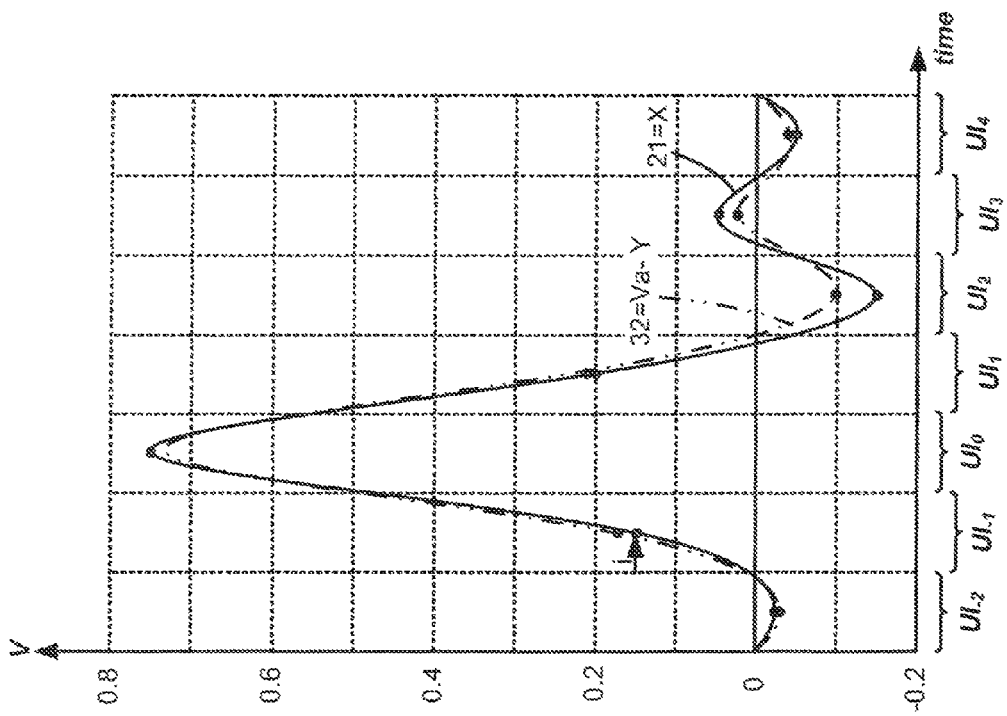

FIG. 7 overlays the positive and negative pulse responses so that differences between the two can be more easily appreciated. To overlay these functions, the negative pulse response 31 has been inverted 32 by subtracting from the magnitude of the ideal pulse Va each of the magnitude terms from the negative pulse response 31, i.e., Va−Y(i) or 1−Y(i) if 1V represents an ideal magnitude logic '1'. Differences in the responses 21 and 32 arise from the asymmetry in the transmitter 12 ($H(s)_{xmit}$) used to generate the responses.

Figure 8:
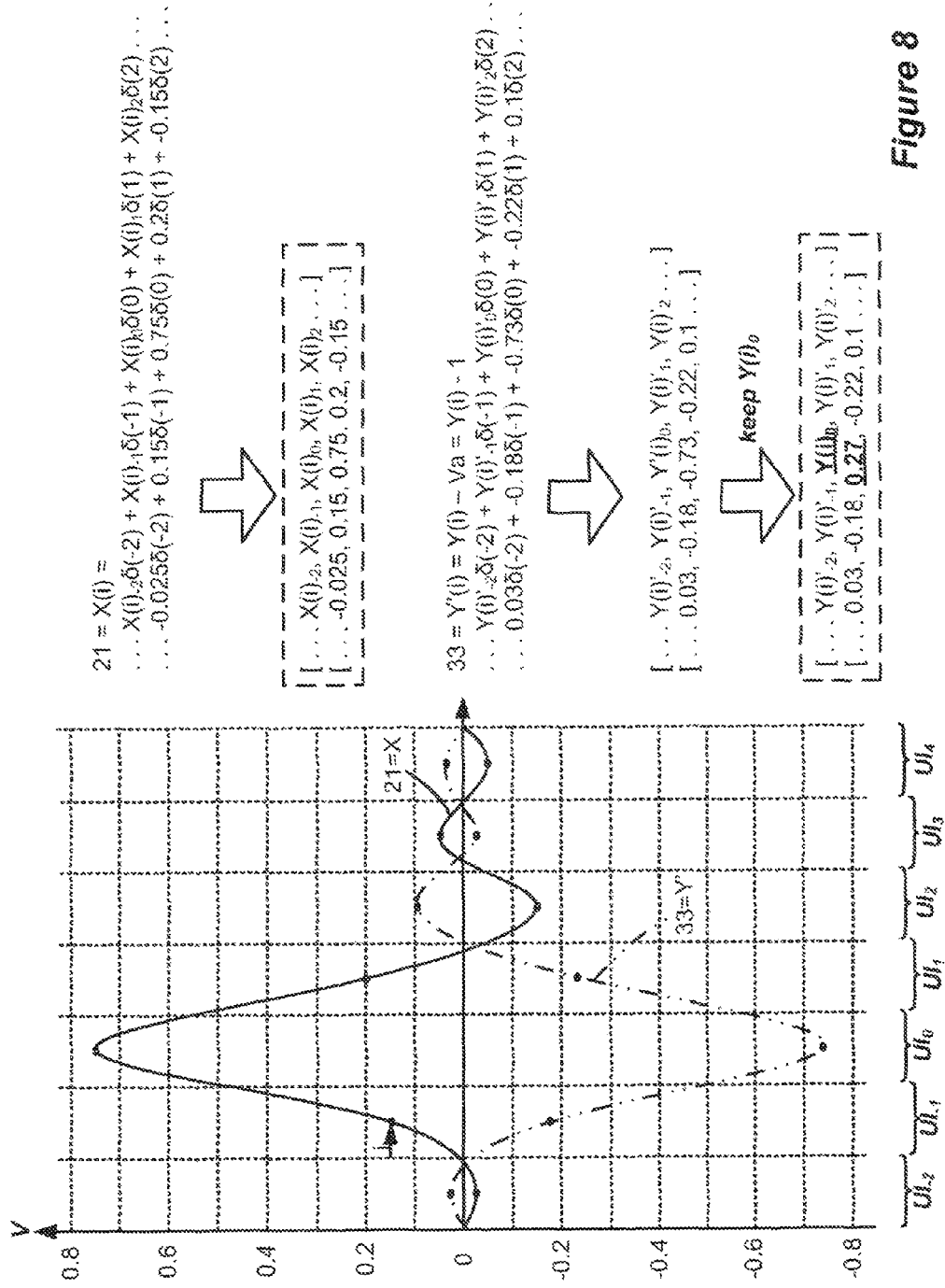

FIG. 8 shows another modification to the negative pulse response 31 which is useful in the computations that follow. Specifically, a vertically-shifted negative pulse response Y' 33 is created from the negative pulse response Y 31 by subtracting the magnitude of the ideal pulse Va from each of its terms, i.e. Y'(i)=Y(i)−Va, or Y(i)−1 if 1V represents an ideal magnitude logic '1'.

From positive pulse response 21 and vertically-shifted negative pulse response 33, vectors useful in generating probability density functions (PDFs) in accordance with the improved technique can be formed, which can be used to characterize the reliability of the transmitter/channel system. These vectors are shown in FIG. 8 within dotted-line boxes for easier viewing. The vector for the positive pulse response 21 remains unchanged from Casper's technique as discussed in the Background: [ ... $X(i)_{-2}$, $X(i)_{-1}$, $X(i)_0$, $X(i)_1$, $X(i)_2$ ... ]. However, the corresponding vertically-shifted negative pulse response vector uses both magnitude values from the original negative pulse response 31 and the vertically-shifted negative pulse response 33. Specifically, the vector incorporates the vertically-shifted negative pulse response 33 magnitude values for the pre- (j<0) and post- (j>0) cursor UIs (i.e., $Y'(i)_{j \ne 0}$), but retains the original cursor UI magnitude value from the negative pulse response 31 (i.e., $Y(i)_0$), resulting in vector [ ... $Y(i)_{-2}$, $Y(i)_{-1}$, $Y(i)_0$, $Y(i)'_1$, $Y(i)'_2$ ... ]. This original value $Y(i)_0$ has been bolded in FIG. 8 and in subsequent figures to make it easier to distinguish from the other shifted values.

Figure 9A:
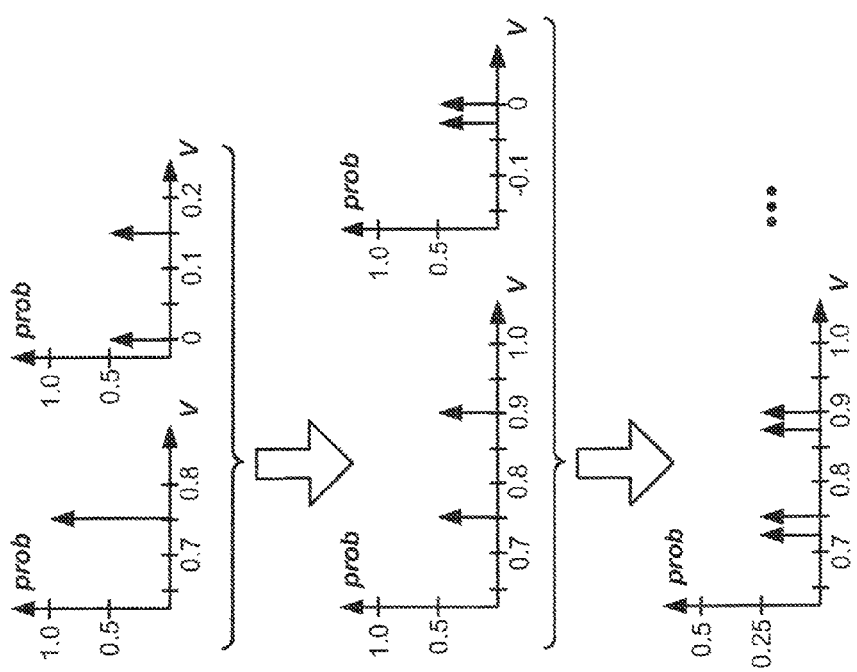

From these vectors, or at least the data within these vectors, the disclosed technique separately calculates PDFs indicative of the reception of logic '1' values ($PDF(i)_1$) and of the reception of logic '0' values ($PDF(i)_0$), and FIGS. 9A and 9B illustrate one example of formulas for computing each. As can be seen in FIG. 9A, $PDF(i)_1$ is calculated by calculating all possible combinations of pre-cursor and post-cursor terms from the pulse response 21 ($X(i)_{j \ne 0}$), forming a PDF of the ISI for the transmitted '1's, and then convolving that PDF with the term for the cursor UI $X(i)_0$=0.75. The process is different from Casper's method because the cursor term $X(i)_0$ is represented as a single value, while the pre- and post-cursor terms $X(i)_{j \ne 0}$ comprise pairs of terms as before. This process builds $PDF(i)_1$ around the cursor UI term, $X(i)_0$. $X(i)_0$ is represented as a single delta function, with a magnitude (probability) of 1 (100%). This term is convolved with pre-cursor term $X(i)_{-1}$=(0.15, 0) to produce a new PDF having values at 0.75 and 0.9, each with a probability of 0.5 (50%). This resulting PDF is then convolved with the next term $X(i)_{-2}$=(−0.025, 0), producing a new PDF having values at 0.725, 0.75, 0.875, 0.9, and so on until all pre- and post-cursor terms ($X(i)_{j \ne 0}$) have been convolved. Again, because convolution is commutative, the order in which the terms are convolved doesn't matter, but starting with the cursor UI term $X(i)_0$ makes it easier to visualize the build up of $PDF(i)_1$ around term $X(i)_0$=0.75. Convolving the cursor UI term $X(i)_0$ with the pre- and post-cursor terms is sensible because in reality, a logic '0' was transmitted in those UIs outside of the ideal positive pulse 20. As such, the values for these pre- and post-cursor terms are already normalized to 0 Volts, and thus can be viewed as indicating the spread that one could expect to see around the cursor UI term $X(i)_0=0.75$.

Referring to FIG. 9B, $PDF(i)_0$ is built similarly, except that the PDF is built around the original cursor UI term $Y(i)_0=0.27$. It is appropriate to build $PDF(i)_0$ around this value because it is indicative of the true magnitude of a received logic '0'. Similar to what was done for $PDF(i)_1$, the vertically-shifted pre- and post-cursor terms $(Y'(i)_{j\neq 0})$ are recursively convolved with each other as well as with the cursor term $Y(i)_0=0.27$ to shift $PDF(i)_0$ around that cursor. This is sensible, in that these vertically-shifted pre- and post-cursor terms $Y'(i)_{j\neq 0}$, can be viewed as a spread that one could expect to see around the cursor UI term $Y(i)_0=0.27$, with such vertical shifting in effect normalizing these terms.

Figure 9C:
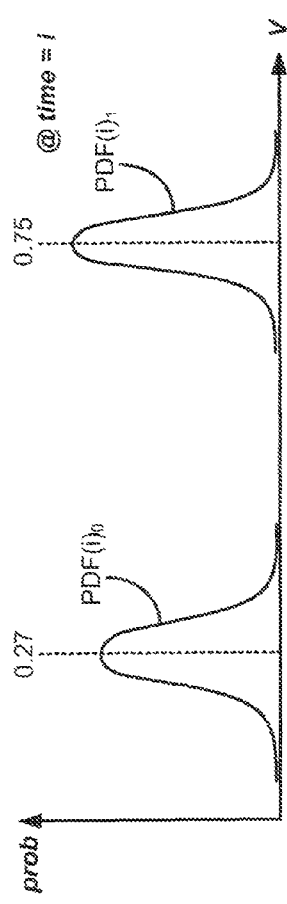

The result of these independent PDF calculations is shown in FIG. 9C, which illustrates the resulting $PDF(i)_1$ and $PDF(i)_0$. At this point, some comparisons to Casper's technique can be drawn. First, notice that because $PDF(i)_1$ and $PDF(i)_0$ are calculated separately, and involve using different terms $(X(i)_{j\neq 0}, Y'(i)_{j\neq 0})$ to build up the PDFs around the cursor intervals, the resulting shape of the PDFs can be non-symmetric. Again, this results from non-linearity in the transmitter 12. Thus, in the example shown, $PDF(i)_1$ is taller but thinner than $PDF(i)_0$. Because one could assume the equal reception of logic '1' and '0's, each of $PDF(i)_1$ and $PDF(i)_0$ should be normalized to cover an area of 50%, a point which for simplicity was not addressed in the formulas in FIGS. 9A and 9B.

Figure 3A:
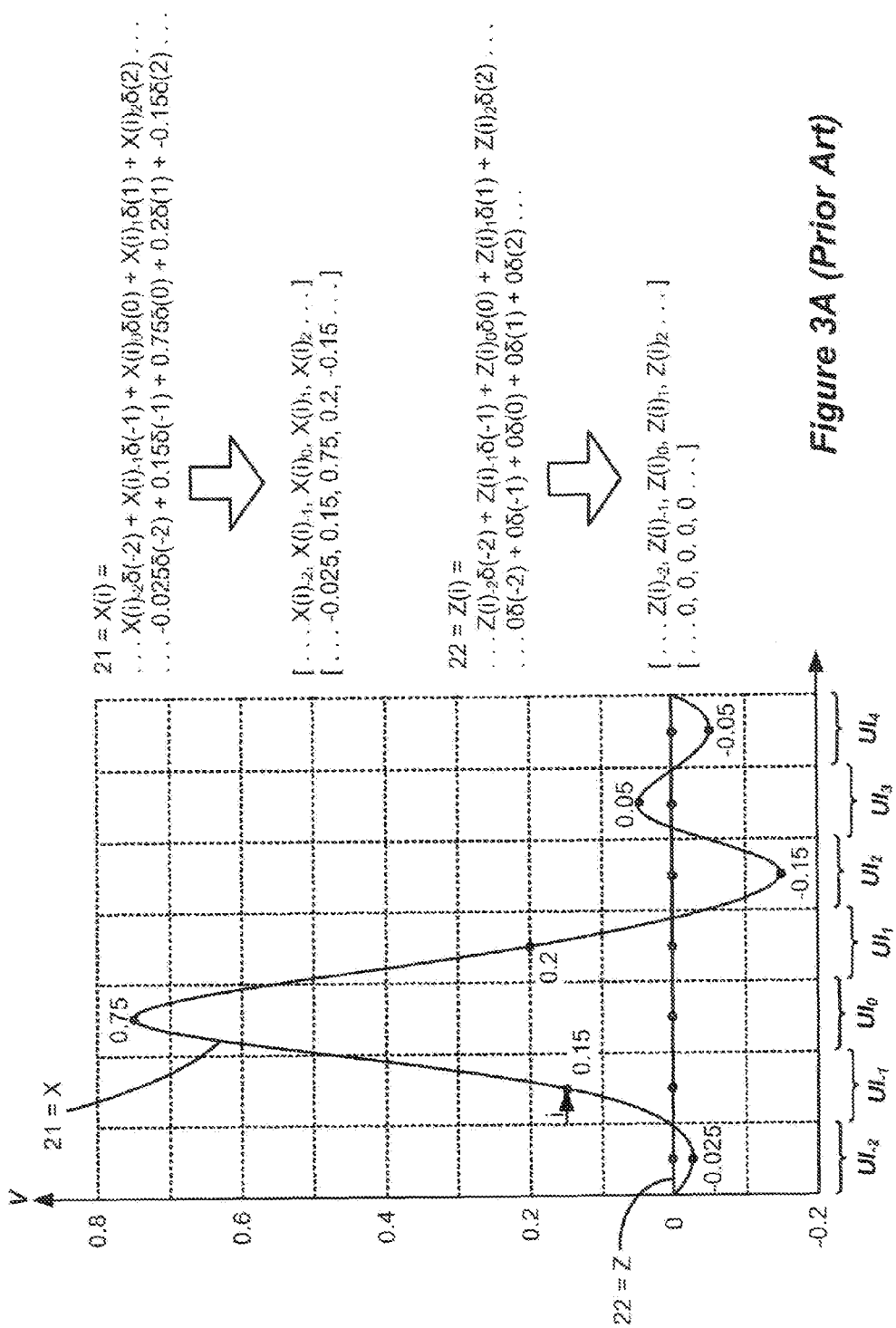
FIGS. 3A-3E illustrate a prior art technique for generating a probability distribution function (PDF) indicative of the statistics of reception of logic '0's and '1's at a receiver at the end of the channel.
Figure 3B:
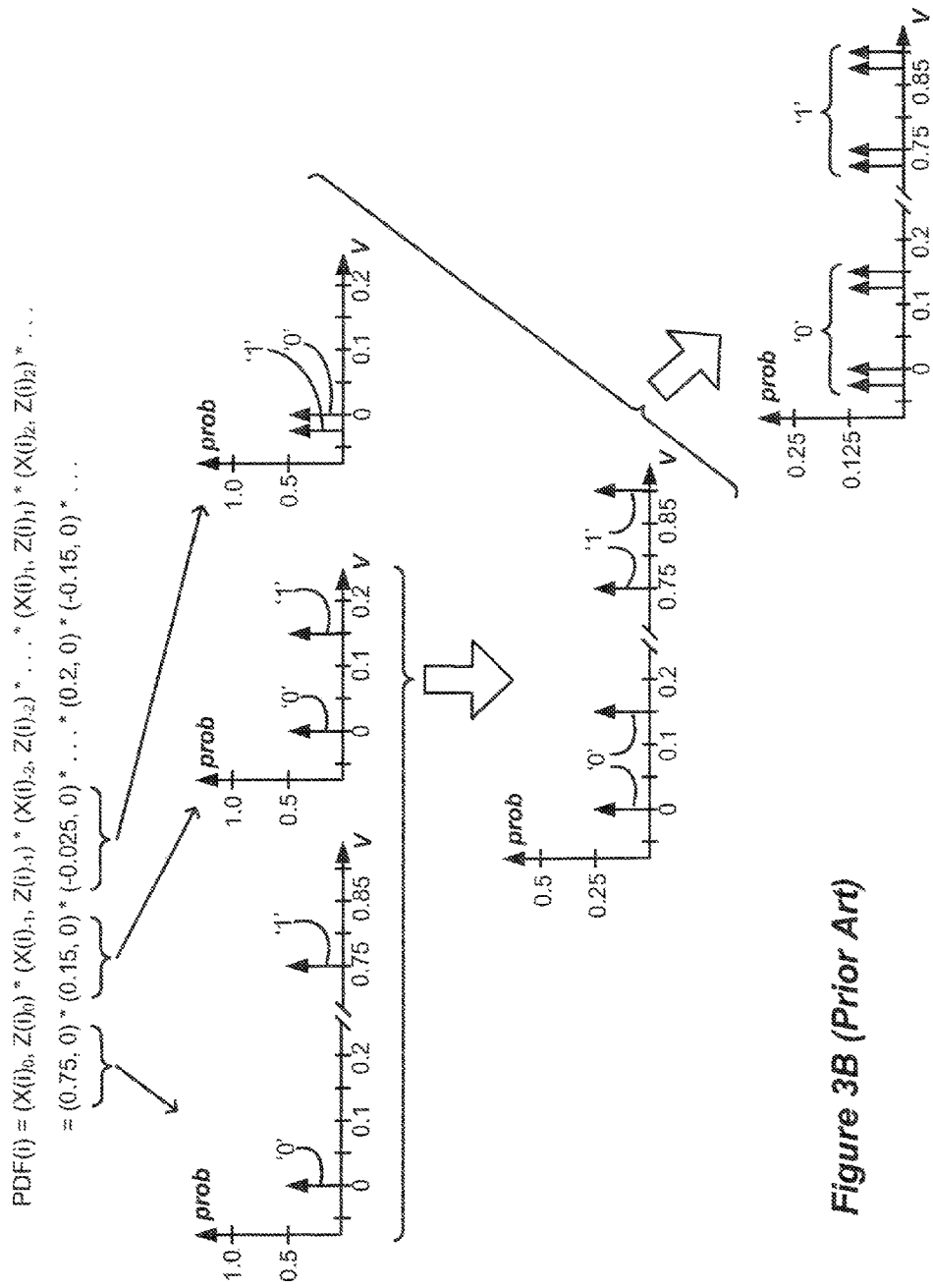
Figure 3C:
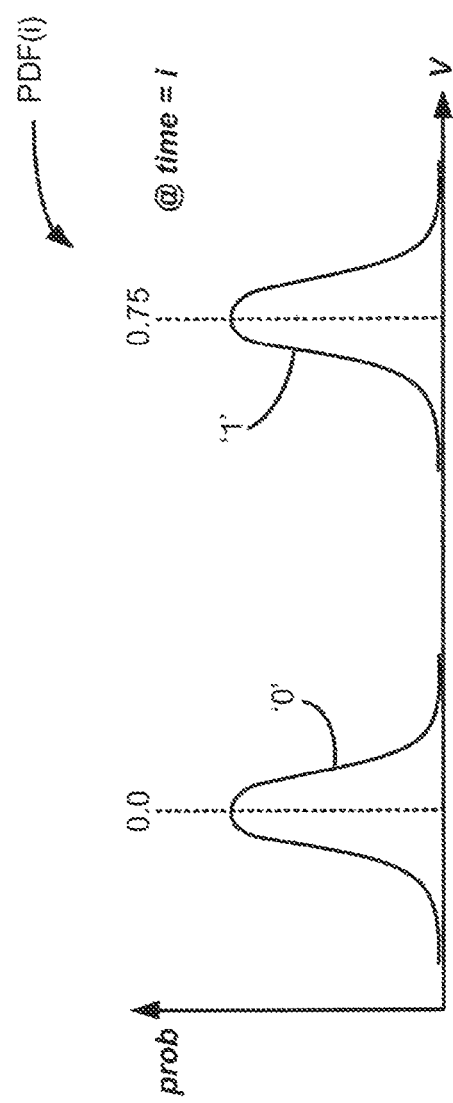

Second, because of the simulation of the ideal negative pulse 30 (FIG. 5B), a more realistic value is observed for the cursor UI value $Y(i)_0=0.27$, with $PDF(i)_0$ then being built around this value. This does not occur in Casper's technique, due to his assumption of a zero response Z 22 having values of zero (FIG. 3A).

Figures 3D, 3E:
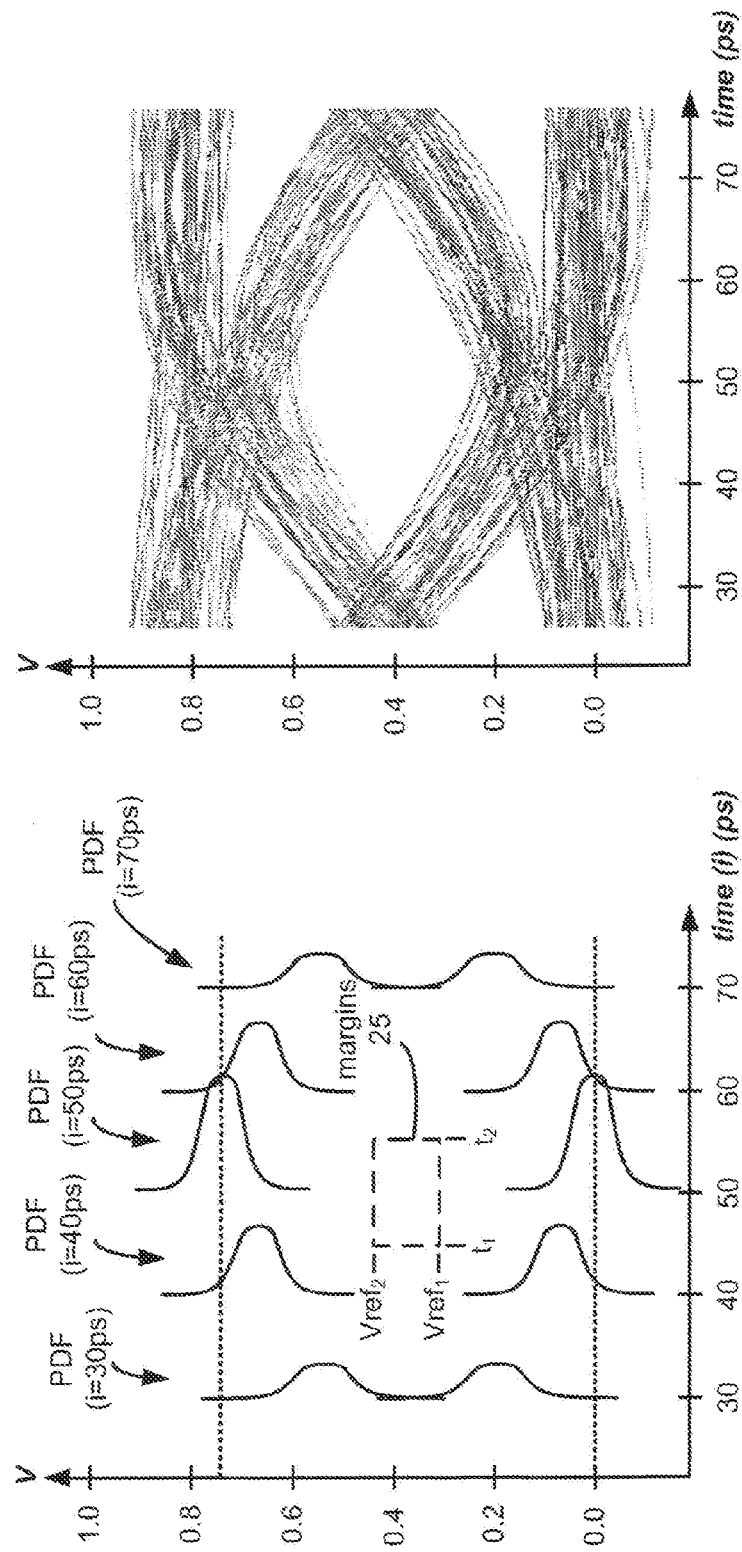
Figure 9D:
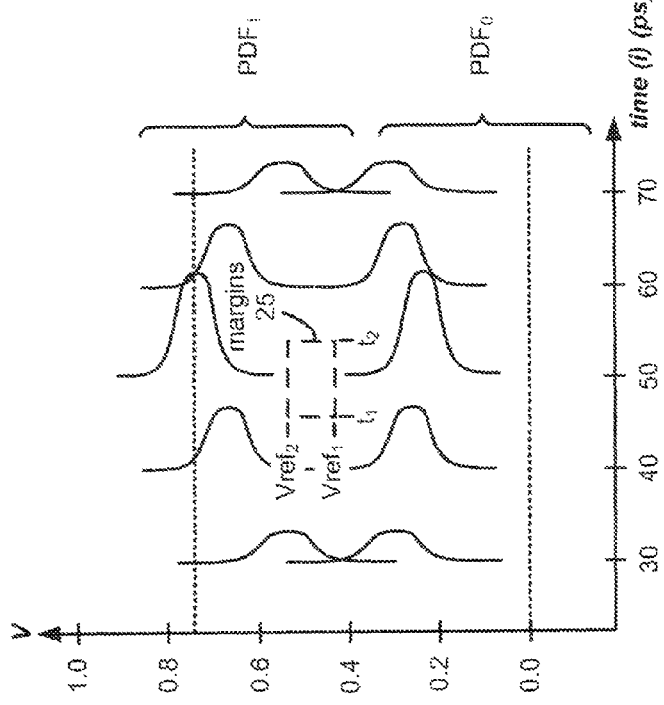

The result, when the disclosed technique is continued for other values of 'i', is the build up of $PDF_1$ and $PDF_0$ across a given UI, as shown in FIG. 9D, similar to FIG. 3D previously discussed. Again, the statistics embodied in the PDFs of FIG. 9D allow sensing reliability to be assessed, and appropriate sensing margins 25 to be set to arrive at a suitable bit error rate.

Figure 10:
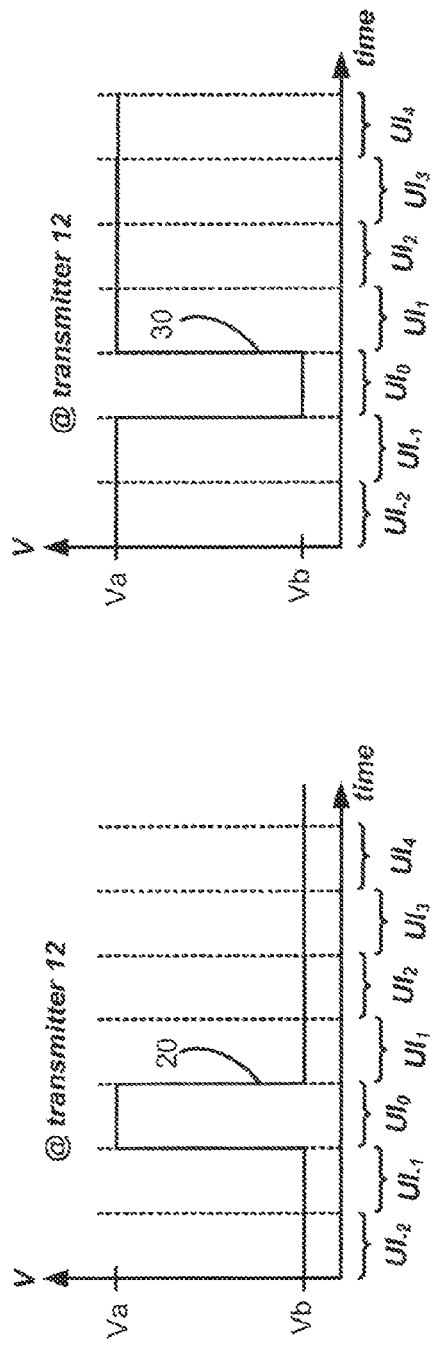
FIG. 10 illustrates modification of the disclosed technique assuming a non-grounded logic state.

FIG. 10 shows how the $PDF(i)_1$ and $PDF(i)_0$ formulas of FIGS. 9A and 9B can be modified to account for ideal pulses 20 and 30 having logic '0' values with a magnitude of Vb. Consideration of such non-grounded pulses is warranted in sophisticated systems utilizing such non-grounded logic states, such as systems utilizing low- or high-common-mode signaling, or systems using logic states of opposite polarities (e.g., 0.5V and −0.5V). As in FIGS. 9A and 9B, the values corresponding to the cursor UI terms, $X(i)_0$ and $Y(i)_0$, remain unchanged. However, the pre- and post-cursor terms $(X(i)_{j\neq 0}, Y'(i)_{j\neq 0})$ are normalized to remove Vb. (Remember that terms $Y'(i)_{j\neq 0}$ have already been normalized to remove Va).

Different terms can be used in the recursive convolution, and FIGS. 11A-11C illustrate some different formulas that can be used in the computer system to calculate $PDF(i)_1$ and $PDF(i)_0$. Which terms are most sensibly used in the recursive convolution can depend on the particulars of the transmission system 10 being simulated, or designer preferences, or may additionally be dictated or limited by computing resources available in the simulating computer system. Experimentation may inform which terms will be most useful in a particular situation. Changing the convolution terms will modify the shapes of the resulting $PDF(i)_1$ and $PDF(i)_0$, and as such will have an effect on the assessment of reception reliability, and the setting of appropriate sensing margins 25, particularly when extremely low bit error rates (e.g., on the order of $10^{-12}$) are considered. However, all of the formulas illustrated herein (FIGS. 9A, 9B, 11A-11C) benefit from building $PDF(i)_0$ around the more realistic cursor term of $Y(i)_0$, a point discussed earlier. Because $Y(i)_0$ will dictate the resulting $PDF(i)_0$ as a first order variable, use of any of the disclosed formulas provides benefit over Casper's technique, regardless of the second-order effect of the convolution terms that are chosen. Other reasons for choosing particular convolution terms are discussed further below.

In FIG. 11A, the convolution terms associated with the cursor UI terms $X(i)_0$ and $Y(i)_0$ have been swapped when compared to the formulas of FIGS. 9A and 9B. Thus, $X(i)_0$ is recursively convolved with the pre- and post-cursor terms from the vertically-shifted negative pulse response 33 (i.e., $(Y'(i)_{-1}, 0) * (Y'(i)_{-2}, 0) * \ldots * (Y'(i)_1, 0) * (Y'(i)_2, 0) * \ldots )$, and $Y(i)_0$ is recursively convolved with the pre- and post-cursor terms from the positive pulse response 21 (i.e., $(X(i)_{-1}, 0) * (X(i)_{-2}, 0) * \ldots * (X(i)_1, 0) * (X(i)_2, 0) * \ldots )$. The results of this calculation will be similar to the results shown in FIG. 9C, except the resulting shapes for $PDF(i)_1$ and $PDF(i)_0$ would be flipped.

In FIG. 11B, each of the cursor UI terms $X(i)_0$ and $Y(i)_0$ are convolved with the pre- and post-cursor terms from both the positive pulse response 21 and the vertically-shifted negative pulse response 33. Because these convolution terms are the same in both of the $PDF(i)_1$ and $PDF(i)_0$ calculations, the resulting PDFs are identical in shape, but not necessarily symmetric from the perspective of the inside of the data eye.

In FIG. 11C, each of the cursor UI terms $X(i)_0$ and $Y(i)_0$ are convolved with the average of the corresponding terms from both the positive pulse response 21 and the vertically-shifted negative pulse response 33. For example, the first convolution term shown in both equations in FIG. 11C comprises $([AVG(X(i)_{-1}, Y'(i)_{-1})], 0)$, or $(AVG[0.15, -0.18], 0)$ or $(-0.015, 0)$. Again, because these convolution terms are the same in both calculations, the resulting PDFs are identical in shape.

Determining the appropriate algorithm to apply can be determined by inspecting the positive and negative pulse responses, 21 and 31, respectively. For example, if when looking at those responses it is observed that pre- and post-cursor terms are small but that the pulses themselves are asymmetric, application of the first algorithm, described in FIGS. 9A and 9B, may be sufficient to capture the first-order asymmetry. It is expected that the algorithm described in FIG. 11B would give similar results, but with perhaps slightly better accuracy as a result of the inclusion of more pre- and post-cursor terms, but at the cost of increased analysis resources (computer memory, etc.). The approach of FIG. 11C, which involves fewer convolution terms, could also be applied to save simulation resources, and would still likely provide good accuracy because terms from both pulse responses are used. If, on the other hand, the pre- and post-cursor terms of one of the pulse responses 21 or 31 are much more prominent than in the other response, then applying the approach described in FIG. 11A will capture such asymmetry.

The disclosed techniques are extendable to multi-level signaling, such as in schemes in which logic states are represented by more than two voltage levels (e.g., logic '0'=Vssq, logic '1'=(Vddq+Vssq)/2, logic '2'=Vddq).

Figure 12:
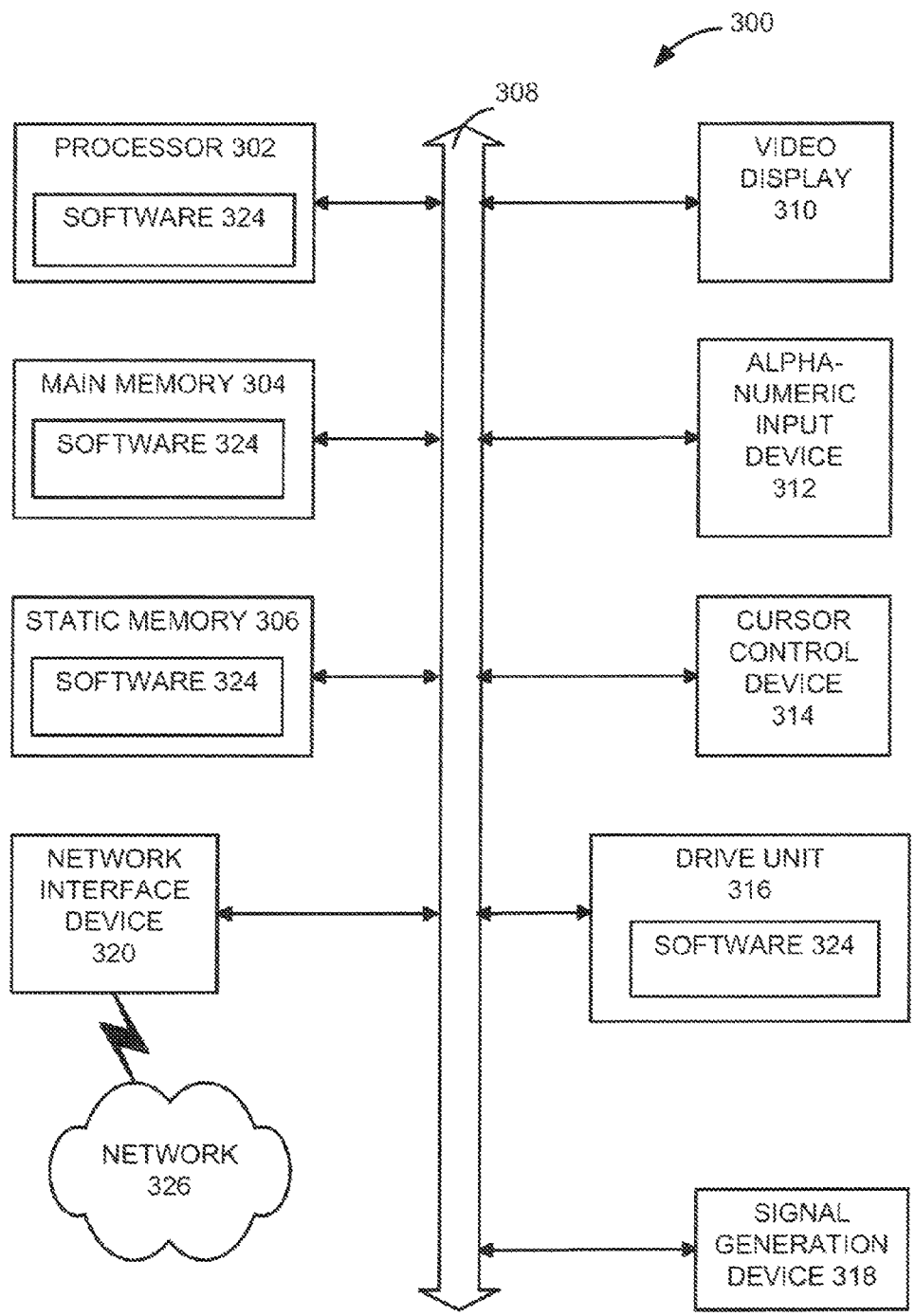
FIG. 12 illustrates an example computer system in which the disclosed technique may be operated.

One skilled in the art will realize that the disclosed techniques are usefully implemented as software 324 running on a computer system, such as computer system 300 illustrated in FIG. 12. The technique can be encoded as software on one or more computer readable media, such as a magnetic or optical disk, semiconductor memory, or other media known in the art for holding software. Such a computer system can be broadly construed as any machine or system capable or useful in reading and executing instructions in the software and making the various computations the disclosed techniques require. Usually, embodiments of the disclosed techniques would be implemented as software installable on a circuit designer's workstation or work server. Moreover, embodiments of the disclosed techniques can easily be incorporated into pre-existing circuit simulation software packages. Different software packages or modules can be used to perform different aspects of the technique. For example, simulation—i.e., generation of the positive and negative pulse responses 21 and 31—can occur using simulation software such as SPICE™, while remaining analysis—generation of the PDFs—can occur using another software program such as Matlab™.

Computer system 300 can operate as a standalone device or may be connected (e.g., networked) to other computer systems. In a networked deployment, the system 300 may operate in the capacity of a server or a client machine in a server-client network environment, or as a peer machine in a peer-to-peer (or distributed) network environment. The computer system 300 may include a personal computer (PC), a workstation such as those typically used by circuit designers, a set-top box (STB), a Personal Digital Assistant (PDA), a cellular telephone, a web appliance, a network router, switch or bridge, or any machine capable of executing a set of instructions within the software, and networked versions of these.

To provide for interaction with a user, computer system 300 can include a video display 310 for displaying information to the user, and may also include a printer (not shown) for providing hard copies of the results. An alpha-numeric input device 312 (e.g., a keyboard), and a cursor control device 314 (e.g., a mouse) can be used to allow the user to provide input to the computer system. Other input devices may be used as well. Data (such as the magnitudes and durations of the ideal pulses 20, 30; the transfer functions for the channel and transmitter, or their electrical parameters, etc.) can be input to the computer system 300 using such input devices, or such data can be loaded in from memory or from a library within the computer system 300.

The exemplary computer system 300 includes a processor 302 (e.g., a central processing unit (CPU), a graphics processing unit (GPU) or both), a main memory 304 and a static memory 306, which communicate with each other via a bus 308. Processors 302 suitable for the execution of software 324 include both general and special purpose microprocessors, and which may be integrated or distributed in the system 300.

The computer system 300 may further include a disk drive unit 316, which includes a computer-readable medium (e.g., a disk) on which the software 324 is stored. The software 324 may also reside, completely or at least partially, within computer-readable media (e.g., semiconductor memory) in the main memory 304 or within the processor 302 during execution thereof by the computer system 300.

The software 324 and/or its associated data may further be transmitted or received over a network 326 via a network interface device 320 utilizing any one of a number of well-known transfer protocols (e.g., HTTP). Network 326 can comprise a local area network ("LAN"), a wide area network ("WAN"), the Internet, and combinations of these.

The disclosed techniques can also be implemented in digital electronic circuitry, in computer hardware, in firmware, in special purpose logic circuitry such as an FPGA (field programmable gate array) or an ASIC (application-specific integrated circuit), or in combinations of these, which again all comprise examples of computer-readable media. When implemented as software, such software can be written in any form of programming language, and can be deployed in any form, including as a stand-alone program or as a module, component, subroutine, or other unit suitable for use in a computing environment.

While preferred embodiments of the invention have been disclosed, it should be understood that the disclosed technique can be implemented in many different ways to the same useful ends as described herein. In short, it should be understood that the inventive concepts disclosed herein are capable of many modifications. To the extent such modifications fall within the scope of the appended claims and their equivalents, they are intended to be covered by this patent.

What is claimed is:

1. A method for assessing the reception of data, comprising:
    simulating in a computer system the transmission of a positive pulse to produce a positive pulse response, wherein the positive pulse response comprises a plurality of positive pulse response values over a plurality of data unit intervals;
    simulating in the computer system the transmission of a negative pulse to produce a negative pulse response, wherein the negative pulse response comprises a plurality of negative pulse response values over a plurality of data unit intervals; and
    processing in the computer system the positive and negative pulse response values to determine first data indicative of a probability of reception of first data states and to determine second data indicative of a probability of reception of second data states.

2. The method of claim 1, wherein the first and second data comprise probability distribution functions.

3. The method of claim 1, wherein the first and second data are indicative of the probabilities at different times within a unit interval.

4. The method of claim 1, wherein the simulation of the transmission of the positive pulse and the negative pulse comprises simulation of those pulses through a transmitter and channel.

5. The method of claim 1, wherein processing the positive and negative pulse response values comprises convolution.

6. The method of claim 1, wherein the positive pulse comprises an ideal positive pulse with a first voltage for a duration of a single unit interval and a second voltage outside of the single unit interval, and wherein the negative pulse comprises an ideal negative pulse with a second voltage for a duration of a single unit interval and a first voltage outside of the single unit interval.

7. A method for assessing the reception of data, comprising:
    simulating in a computer system the transmission of a positive pulse through a transmitter and a channel to produce a positive pulse response at a receiver, wherein the positive pulse response comprises a plurality of positive pulse response values over a plurality of data unit intervals;
    simulating in the computer system the transmission of a negative pulse through the transmitter and the channel to produce a negative pulse response at the receiver, wherein the negative pulse response comprises a plurality of negative pulse response values over a plurality of data unit intervals; and
    processing in the computer system the positive and negative pulse response values to determine data indicative of the reception of first and second data states at the receiver.

8. The method of claim 7, wherein the processing comprises a first computation to determine the data indicative of the reception of first data states, and a second computation to determine the data indicative of the reception of second data states.

9. The method of claim 7, wherein the processing of the negative pulse response values comprises shifting at least some of the negative pulse response values by a magnitude of the positive pulse.

10. The method of claim 7, wherein the processing of the negative pulse response values comprises normalizing at least some of the negative pulse response values relative to zero.

11. The method of claim 7, wherein the positive pulse response values are processed to determine the data indicative of the reception of second data states, and wherein the negative pulse response values are processed to determine the data indicative of the reception of first data states.

12. The method of claim 7, wherein the simulating and processing occur in different sub-systems in the computer system.

13. A method for assessing the reception of data, comprising:
   simulating in a computer system the transmission of a positive pulse to produce a positive pulse response, wherein the positive pulse response comprises a plurality of positive pulse response values over a plurality of data unit intervals;
   simulating in the computer system the transmission of a negative pulse to produce a negative pulse response, wherein the negative pulse response comprises a plurality of negative pulse response values over a plurality of data unit intervals;
   performing a first computation in the computer system using at least some of the positive and negative pulse response values to determine at least one first probability distribution function indicative of the reception of first data states; and
   performing a second computation in the computer system using at least some of the positive and negative pulse response values to determine at least one second probability distribution function indicative of the reception of second data states.

14. The method of claim 13, wherein the first and second probability distribution functions respectively indicate the probability of reception of a first and second data states at a particular voltage.

15. The method of claim 13, wherein the positive and negative pulse response values are indexed to a particular time 'i', and wherein the first and second probability distribution functions are also referenced to time 'i'.

16. The method of claim 15, wherein the method is repeated at different values of 'i'.

17. The method of claim 13, further comprising determining a bit error rate from the first and second probability distribution functions.

18. The method of claim 13, further comprising determining sensing margins for a receiver from the first and second probability distribution functions.

19. The method of claim 18, wherein the sensing margins comprise either or both of a reference voltage and a time at which received data is sensed.

20. A method for assessing the reception of data, comprising:
   simulating in a computer system the transmission of a positive pulse in a first unit interval to produce a positive pulse response, wherein the positive pulse response comprises a first cursor unit interval value corresponding to the first unit interval and a plurality of positive pulse response values occurring in other unit intervals;
   simulating in the computer system the transmission of a negative pulse in a second unit interval to produce a negative pulse response, wherein the negative pulse response comprises a second cursor unit interval value corresponding to the second unit interval and a plurality of negative pulse response values occurring in other unit intervals;
   performing a first computation in the computer system using the first cursor unit interval value and at least some of the positive and negative response values to determine at least one probability distribution function indicative of the reception of first data states; and
   performing a second computation in the computer system using the second cursor unit interval value and at least some of the positive and negative response values to determine at least one probability distribution function indicative of the reception of second data states.

21. The method of claim 20, wherein a magnitude of the positive pulse is subtracted from the negative pulse response values to produce shifted negative pulse response values.

22. The method of claim 21, wherein the first computation recursively convolves the first cursor unit interval value with the positive pulse response values, and wherein the second computation convolves the second cursor unit interval value with the shifted negative pulse response values.

23. The method of claim 21, wherein the first computation recursively convolves the first cursor unit interval value with the shifted negative pulse response values, and wherein the second computation convolves the second cursor unit interval value with the positive pulse response values.

24. The method of claim 21, wherein the first computation recursively convolves the first cursor unit interval value with the positive pulse response values and the shifted negative pulse response values, and wherein the second computation convolves the second cursor unit interval value with the positive pulse response values and the shifted negative pulse response values.

25. The method of claim 21, wherein the positive pulse response values and the shifted negative pulse response values in corresponding unit intervals are averaged to produce averaged values, and wherein the first computation recursively convolves the first cursor unit interval value with the averaged values, and wherein the second computation recursively convolves the second cursor unit interval value with the averaged values.

* * * * *

UNITED STATES PATENT AND TRADEMARK OFFICE
CERTIFICATE OF CORRECTION

| | | |
|---|---|---|
| PATENT NO. | : 8,682,621 B2 | Page 1 of 1 |
| APPLICATION NO. | : 12/838144 | |
| DATED | : March 25, 2014 | |
| INVENTOR(S) | : Hollis | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 746 days.

Signed and Sealed this
Eleventh Day of August, 2015

Michelle K. Lee
*Director of the United States Patent and Trademark Office*